(12) United States Patent
Back et al.

(10) Patent No.: US 8,876,287 B2
(45) Date of Patent: Nov. 4, 2014

(54) OPHTHALMIC LENSES AND REDUCTION OF ACCOMMODATIVE ERROR

(75) Inventors: Arthur Back, Pleasanton, CA (US); Kuang-mon Ashley Tuan, Pleasanton, CA (US)

(73) Assignee: CooperVision International Holdings Company, LP, St. Michael (BB)

( * ) Notice: Subject to any disclaimer, the term of this patent is extended or adjusted under 35 U.S.C. 154(b) by 523 days.

(21) Appl. No.: 13/318,406

(22) PCT Filed: May 3, 2010

(86) PCT No.: PCT/US2010/033381
§ 371 (c)(1),
(2), (4) Date: Mar. 2, 2012

(87) PCT Pub. No.: WO2010/129465
PCT Pub. Date: Nov. 11, 2010

(65) Prior Publication Data
US 2012/0176582 A1    Jul. 12, 2012

Related U.S. Application Data

(60) Provisional application No. 61/175,201, filed on May 4, 2009.

(51) Int. Cl.
G02C 7/04    (2006.01)
G02C 7/06    (2006.01)

(52) U.S. Cl.
CPC ...... *G02C 7/041* (2013.01); *G02C 7/06* (2013.01); *G02C 7/042* (2013.01); *G02C 2202/24* (2013.01)
USPC ............ 351/159.12; 351/159.41; 351/159.52; 351/159.1; 351/159.79

(58) Field of Classification Search
CPC .......... G02C 7/04; G02C 7/041; G02C 7/044; G02C 7/06; G02C 2202/24
USPC ............... 351/159.05, 159.1, 159.12, 159.52, 351/159.41, 159.79, 159.73
See application file for complete search history.

(56) References Cited

U.S. PATENT DOCUMENTS 4,199,231 A * 4/1980 Evans ...................... 351/159.33
4,420,228 A   12/1983 Humphrey
(Continued)

FOREIGN PATENT DOCUMENTS

CN    1089825 A    7/1994
CN    1420380 A    5/2003
(Continued)

OTHER PUBLICATIONS

Manny, Ruth E. et al. "Accommodative Lag by Autorefraction and Two Dynamic Retinoscopy Methods." Optom. Vis Sci 86.3 (2009): 233-243. Print.*

(Continued)

*Primary Examiner* — Zachary Wilkes
(74) *Attorney, Agent, or Firm* — Kilyk & Bowersox, P.L.L.C.

(57) ABSTRACT

Ophthalmic lenses provide clear visual acuity and present a myopic defocused image to the lens wearer at both near and distant viewing distances. The present lenses are used in methods to reduce ocular accommodative error in lens wearers. Methods of manufacturing the present lenses are described.

16 Claims, 2 Drawing Sheets

(56) References Cited

U.S. PATENT DOCUMENTS

| | | |
|---|---|---|
| 5,404,183 A | 4/1995 | Seidner |
| 5,485,228 A | 1/1996 | Roffman et al. |
| 5,517,259 A | 5/1996 | Blum et al. |
| 5,528,321 A * | 6/1996 | Blum et al. ............. 351/159.74 |
| 5,541,678 A | 7/1996 | Awanohara et al. |
| 5,875,019 A | 2/1999 | Villani |
| 5,988,813 A | 11/1999 | Neadle et al. |
| 6,305,802 B1 | 10/2001 | Roffman et al. |
| 6,364,483 B1 | 4/2002 | Grossinger et al. |
| 6,652,095 B2 | 11/2003 | Tung |
| 6,709,102 B2 | 3/2004 | Duppstadt |
| 6,752,499 B2 | 6/2004 | Aller |
| 6,926,406 B2 | 8/2005 | Mitsui |
| 7,025,460 B2 | 4/2006 | Smitth et al. |
| 7,216,977 B2 | 5/2007 | Poulain et al. |
| 7,287,853 B2 | 10/2007 | Toshima et al. |
| 7,374,285 B2 | 5/2008 | Toshima et al. |
| 7,540,610 B2 | 6/2009 | Carimalo et al. |
| 7,832,859 B2 * | 11/2010 | Phillips ....................... 351/159.1 |
| 8,672,473 B2 | 3/2014 | Martinez et al. |
| 2002/0149742 A1 | 10/2002 | Back |
| 2003/0058407 A1 | 3/2003 | Aller |
| 2003/0088313 A1 | 5/2003 | Nigam |
| 2004/0085515 A1 | 5/2004 | Roffman et al. |
| 2005/0041202 A1 | 2/2005 | Jubin et al. |
| 2005/0218536 A1 | 10/2005 | Quinn et al. |
| 2005/0237482 A1 | 10/2005 | Jubin et al. |
| 2007/0019155 A1 | 1/2007 | Back |
| 2007/0035052 A1 | 2/2007 | Goodenough et al. |
| 2007/0122450 A1 | 5/2007 | Osio Sancho |
| 2007/0296916 A1 | 12/2007 | Holden et al. |
| 2008/0218687 A1 | 9/2008 | Phillips |
| 2008/0291393 A1 | 11/2008 | Menezes |
| 2009/0257026 A1 | 10/2009 | Varnas et al. |
| 2010/0270693 A1 | 10/2010 | Goodenough et al. |
| 2012/0113386 A1 | 5/2012 | Back |
| 2012/0113388 A1 | 5/2012 | Back |
| 2012/0194780 A1 | 8/2012 | Back |
| 2012/0213922 A1 | 8/2012 | Quinn et al. |

FOREIGN PATENT DOCUMENTS

| | | |
|---|---|---|
| CN | 1672085 A | 9/2005 |
| EP | 2028528 A1 | 2/2009 |
| FR | 2871247 A1 | 12/2005 |
| JP | 2002515132 A | 5/2002 |
| JP | 2003524206 A | 8/2003 |
| JP | 2007-511803 | 5/2007 |
| WO | 9314434 A1 | 7/1993 |
| WO | 9616621 A1 | 6/1996 |
| WO | 9726580 A1 | 7/1997 |
| WO | 01/47449 A1 | 7/2001 |
| WO | 0163344 A1 | 8/2001 |
| WO | 2005019907 A1 | 3/2005 |
| WO | 2005-055891 A1 | 6/2005 |
| WO | 2005098478 A1 | 10/2005 |
| WO | 2007021597 A2 | 2/2007 |
| WO | 2007041796 A1 | 4/2007 |
| WO | 2007146673 A2 | 12/2007 |
| WO | 2008111856 A1 | 9/2008 |
| WO | 2008131479 A1 | 11/2008 |
| WO | 2008144497 A1 | 11/2008 |
| WO | 2009052570 A1 | 4/2009 |
| WO | 2009129528 A1 | 10/2009 |

OTHER PUBLICATIONS

Seidemann et al., "An evaluation of the lag of accommodation using photorefraction," Vision Research, vol. 43, No. 4, Feb. 1, 2003, pp. 419-430.

Cheng et al., "The effect of positive-lens addition and base-in prism on accommodation accuracy and near horizontal phoria in Chinese myopic children," Ophthalmic and Physiological Optics, vol. 28, No. 3, May 1, 2008, pp. 225-237.

Supplementary European Search Report issued in corresponding European Patent Application No. 10772641 dated Feb. 24, 2012 (3 pages).

Office Action received in corresponding Japanese Patent Application No. 2012-509870 dated Apr. 5, 2012 (in Japanese with English translation attached) (5 pages).

International Search Report and Written Opinion of International Searching Authority issued in corresponding International Patent Application No. PCT/US2010/033381 dated Jun. 28, 2010 (13 pages).

International Preliminary Report on Patentability issued in corresponding International Patent Application No. PCT/US2010/033381 dated Oct. 19, 2011 (16 pages).

Office Action issued in corresponding Japanese Patent Application No. 2012-509870, dated Nov. 15, 2012 (in Japanese with English translation attached) (12 pages).

Office Action issued in corresponding Australian Patent Application No. 2010246164, dated Aug. 29, 2013, 4 pages.

Cheng, Desmond, "Bifocal Lens Control of Myopia Progression in Children," PhD Thesis, School of Optometry, Queensland University of Technology, Brisbane, Australia, 2008, 143 pages.

Wallman et al., "Homeostasis of Eye Growth and the Question of Myopia," Neuron, vol. 43, pp. 447-468, Aug. 19, 2004.

Chung et al., "Near esophoria is associated with high myopia," Clinical and Experimental Optometry, vol. 83, No. 2, Mar. 1, 2000, pp. 71-75 (5 pages).

Office Action received in U.S. Appl. No. 13/318,625 dated Jun. 25, 2013 (19 pages).

Office Action received in U.S. Appl. No. 13/318,625 dated Jan. 17, 2014 (17 pages).

Office Action received in U.S. Appl. No. 13/318,625 dated Aug. 7, 2014 (12 pages).

Office Action received in U.S. Appl. No. 13/318,630 dated Mar. 25, 2014 (7 pages).

Office Action received in U.S. Appl. No. 13/318,433 dated Aug. 1, 2013 (13 pages).

Statement of Grounds and Particulars in view of Opposition issued in corresponding Australian Patent Application No. 2010246164 dated Jul. 9, 2014, 7 pages.

Cheng et al., "The effect of positive-lens addition and base-in prism on accommodation accuracy and near horizontal phoria in Chinese myopic children," Ophthal. Physiol. Opt., 2008, vol. 28, pp. 225-237.

Anstice et al., "Accommodative status of children enrolled in the DIMENZ trial (dual-focus inhibition of myopia evaluation in New Zealand)," Ophthal. Physiol. Opt., 2006, vol. 26 (Suppl. 1), (Section F041 at pp. 35-36), pp. 1-67.

* cited by examiner

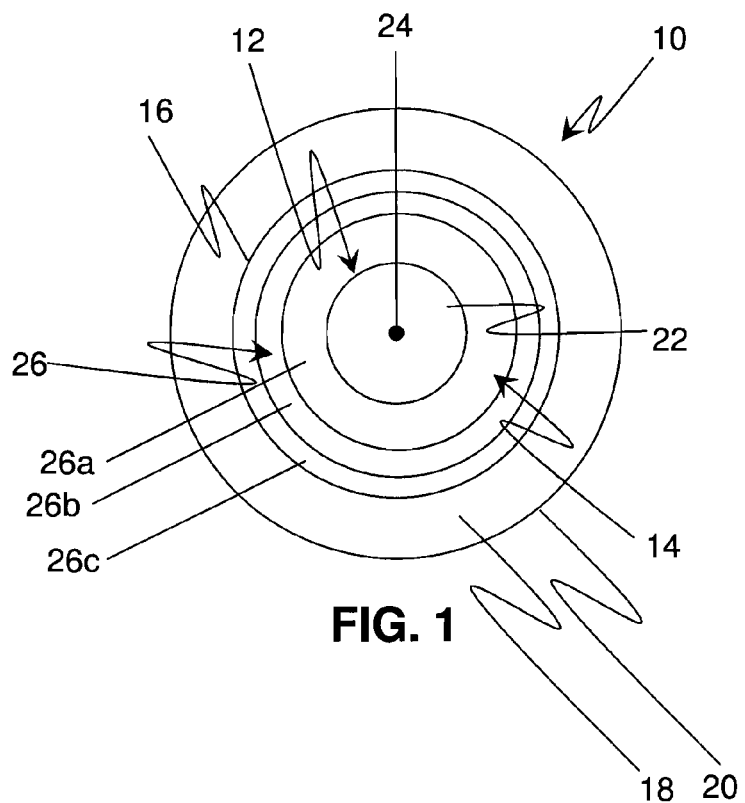
FIG. 1
FIG. 2
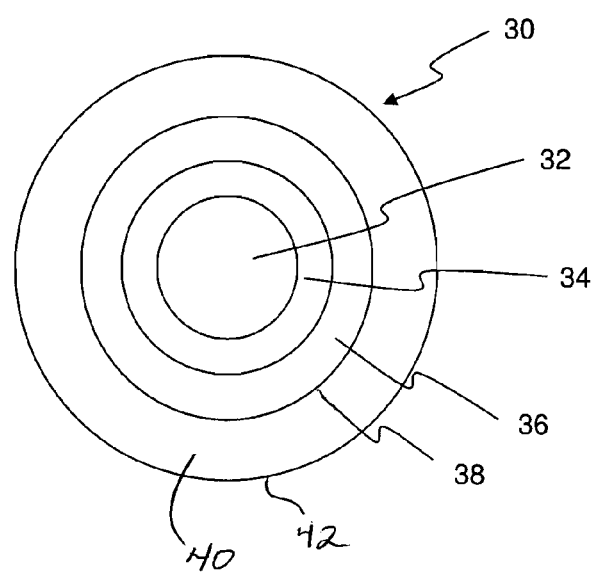

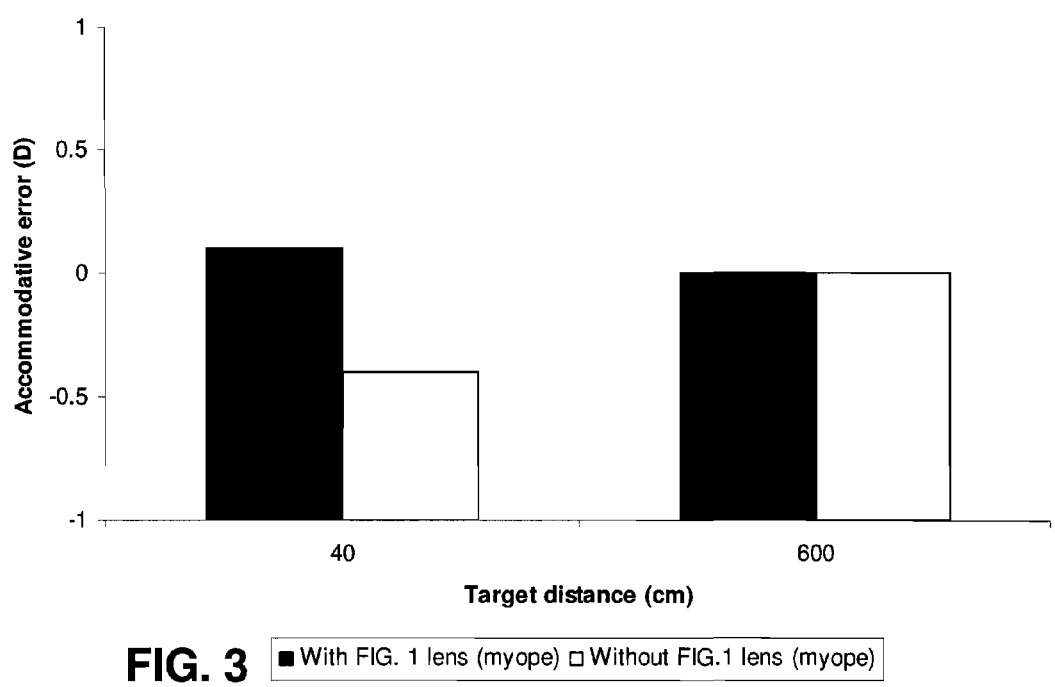

OPHTHALMIC LENSES AND REDUCTION OF ACCOMMODATIVE ERROR

This application is a National Stage Application of PCT/US2010/033381, filed May 3, 2010, and which claims the benefit under 35 U.S.C. §119(e) of prior U.S. Provisional Patent Application No. 61/175,201, filed May 4, 2009, which is incorporated in its entirety by reference herein.

FIELD

The present invention relates to ophthalmic lenses and methods, such as methods of making and methods of using the ophthalmic lenses. More specifically, ophthalmic lenses and methods are disclosed for reducing accommodative error, and methods of manufacturing such ophthalmic lenses are disclosed.

BACKGROUND

Myopia, or near-sightedness, affects a substantial proportion of the world's population, especially in some Asian countries. Myopia is typically associated with an abnormal elongation of a person's eye-ball. The elongated eye-ball results in the retina being located out of the "normal" focal plane such that distant objects are focused in front of the retina rather than on the plane of the retina. The enlarged elongated eye-ball associated with more severe myopia can also be associated with retinal detachment, glaucomatous damage and degenerative myopic retinopathy.

Efforts for reducing the progression of myopia have been attempted and include using multifocal spectacle or contact lenses, using lenses which affect optical aberrations, reshaping the cornea, and using pharmacological agents. Some ophthalmic lenses have been described for reducing progression of myopia that include a vision correction area that provides clear vision at near and distant viewing distances and a myopic defocus area that provides a defocused image at near and distant viewing distances. Difficulties associated with some of the proposed attempts at reducing myopia progression include pharmaceutical side effects, discomfort, compromised vision, or combinations thereof.

SUMMARY

New methods or uses of certain ophthalmic lenses have been invented. The present ophthalmic lenses comprise a vision correction region and a myopic defocus region. With the present ophthalmic lenses, a reduction or reductions in ocular accommodative error can be achieved. In other words, by providing the present lenses, it is possible for lens wearers to exhibit reduced accommodative error in an eye or eyes compared to the eye or eyes without the lenses. Examples include a reduction in accommodative lag, a reduction in accommodative lead, or both.

In one aspect, a method for reducing accommodative error in a patient capable of ocular accommodation is provided. The method comprises providing an ophthalmic lens to be disposed relative to a patient's eye. The ophthalmic lens comprises or includes a vision correction region and a myopic defocus region. Details of the ophthalmic lens are described further herein. The lens can be provided to a lens distributor, an optician, a patient, or a combination thereof. If the lens is a contact lens, the patient can place the lens on the patient's eye and reduced accommodative error can be observed compared to the accommodative error observed without the lens placed on the eye. If the lens is a spectacle lens, the patient can place the lens near the patient's eye and reduced accommodative error can be observed compared to the accommodative error observed without the lens placed near the eye.

In another aspect, methods of manufacturing ophthalmic lenses are provided. The methods comprise a step of forming a lens forming material into an ophthalmic lens, as herein described.

In another aspect, uses of the lenses or lens forming materials are provided. For example, an aspect of the invention relates to the new use of the present ophthalmic lenses to reduce accommodative error in a patient capable of ocular accommodation. The patient may be in need of accommodative error improvement. Another aspect relates to the use of a lens design in the manufacture of an ophthalmic lens for reducing accommodative error in a patient capable of ocular accommodation, as herein described.

Aspects of the present invention are also described by the appended claims.

Various embodiments of the present invention are described in detail in the detailed description below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and claims.

BRIEF DESCRIPTION OF THE DRAWINGS

FIG. 1 is a front plan view of a first example of an ophthalmic lens used in the present methods.

FIG. 2 is a front plan view of a second example of an ophthalmic lens used in the present methods.

FIG. 3 is a graph illustrating accommodative error as a function of target distance.

DETAILED DESCRIPTION

The present methods and uses involve certain ophthalmic lenses and their ability to reduce accommodative error of eyes of lens wearers compared to the accommodative error observed without the ophthalmic lenses but fully corrected for distance vision. By practising the methods and uses disclosed herein, accommodative error is reduced and the accuracy of accommodation is improved. The change in accommodative error may be observed by an optician, such as an optometrist or an ophthalmologist, or may be observed by a machine configured to measure accommodative error, record accommodative error, analyze accommodative error data, or combinations thereof. In addition, the accuracy of accommodation may be observed by the patient or lens wearer by improved vision performance, visual acuity, or other quantifiable measure of vision improvement.

In reference to the present disclosure, an ophthalmic lens refers to a lens that is placed in proximity to a patient's eyes to provide improved vision performance to the patient. For example, an ophthalmic lens can be a contact lens that is placed on the cornea of an eye, an intraocular lens that is placed in an eye, a corneal onlay lens that is placed between a corneal epithelium and corneal stroma of an eye, a corneal inlay lens that is placed in the corneal stroma of an eye, or a spectacle lens that is provided in a frame to be held in front of an eye. The ophthalmic lens can provide refractive vision correction to a lens wearer or patient in need of refractive vision correction.

Ocular accommodation refers to an optical change in the power of the eye. Typically, ocular accommodation refers to the ability of the eye to change the refractive power of the eye's lens by changing the shape of the ocular lens. When a patient has no accommodative error, the patient does not have an accommodative lag or an accommodative lead. Accommodative lag is the amount by which the accommodative response of the eye is less than the dioptric stimulus to accommodation. Accommodative lead is the amount by which the accommodative response of the eye is greater than the dioptric stimulus to accommodation. Prior to becoming presbyopic, a person is able to sufficiently accommodate; however, a person's ability to accommodate deteriorates over time.

Myopic patients (myopes) have been described as having larger lag of ocular accommodation compared to emmetropic patients (emmetropes). The larger lag of accommodation is illustrated as a larger accommodative error compared to the accommodative error of emmetropes. A patient with no accommodative lag or no accommodative lead has an accommodative error of zero. Similarly, a patient with an accommodative lag has a negative accommodative error, and a patient with an accommodative lead has a positive accommodative error. The extent of the accommodative error is commonly measured in diopters.

The methods and uses of the ophthalmic lenses described herein are effective in reducing accommodative error in a human patient that is capable of ocular accommodation. Thus, the present methods and uses are particularly beneficial for non-presbyopic patients since presbyopic patients or presbyopes have diminished or no ability to accommodate. Presbyopia is most frequently diagnosed in people who are about forty years old or older. Thus, the present methods and uses are especially beneficial for patients less than forty years old. In certain embodiments, the methods and uses are useful in young adults, children, or both. For example, the present methods and uses are effective in reducing accommodative error or improving accommodative accuracy in patients less than twenty-five years old.

To measure accommodative error, conventional equipment and methods may be used as understood by persons of ordinary skill in the art. For example, a retinoscope or a refractometer can be used to measure accommodative responses at different distances, such as at near, intermediate, or far target distances, as described herein. An example of a retinoscope that can be used is the ELITE retinoscope available from WelchAllyn (Skaneateles Falls, N.Y., USA) and an example of a refractometer that can be used is the WR-5100K available from Grand Seiko (Fukuyama, Japan). Additional retinoscopes that can be used are available from companies such as Keeler (Windsor, UK) and Heine (Herrsching, Germany). In a clinical setting, at least one accommodative error measurement is made at a near distance, such as 40 cm, and at least one accommodative error measurement is made at a far distance, such as 6 m (600 cm) or virtual infinity. Examples of targets that can be used to measure accommodative error include conventional eye charts, such as a Snellen eye chart, or a Maltese cross. Single accommodative error measurements can be made or multiple accommodative error measurements can be made and averaged to provide an indication of the accommodative error for the patient's eye. Accommodation responses can be recorded for both eyes or for one eye, as desired. As is understood, since some aspects of ocular function are controlled by yoked muscles, frequently, accommodation is only measured in one eye. For example, an ophthalmic lens may be placed in close proximity to an eye of a patient. The accommodative error of the eye can be observed by measuring the accommodative error in the eye without the ophthalmic lens, but while the patient is viewing the target with the ophthalmic lens. An example of measurement of accommodation and accommodative error is described herein.

In practising the present methods, an ophthalmic lens is provided. In other words, a method for reducing accommodative error in a patient capable of ocular accommodation comprises a step of providing at least one ophthalmic lens. As used herein, the words "a" or "an" mean one or more and are used interchangeably with the phrase "at least one". The ophthalmic lens is to be disposed relative to a patient's eye that is capable of ocular accommodation and for which improvement in accommodative error is desired. The ophthalmic lens is disposed relative to the patient's eye to allow light to pass through the lens towards the retina of the eye. When the ophthalmic lens is a contact lens, the contact lens is placed on the corneal epithelium of the eye such that the posterior surface of the contact lens is facing the corneal epithelium.

The ophthalmic lens that is provided comprises a vision correction region and a myopic defocus region. As discussed herein, the vision correction region can comprise one or more visually identifiable zones, or the myopic defocus region can comprise one or more visually identifiable zones, or both. A vision correction region can be understood to be a portion of the ophthalmic lens that provides vision correction, such as a correction of visual acuity. A myopic defocus region can be understood to be a portion of the ophthalmic lens that provides myopic defocus to the lens wearer's eye. The different zones of the vision correction region, the myopic defocus region, or both, can be positioned in a variety of different configurations. In addition, it can be understood that the vision correction region and the myopic defocus region of the ophthalmic lens can define the optic zone of the ophthalmic lens. Or, stated differently, the optic zone of the ophthalmic lens can consist essentially of the vision correction region and the myopic defocus region.

The vision correction region of the ophthalmic lens has a refractive power to correct the patient's distance visual acuity of the eye. Thus, the vision correction region of the ophthalmic lens can be understood to have a distance optical power, a distance power, or a distance vision power. In embodiments, the vision correction region has a refractive power from about 0 diopters to about −10.0 diopters. This is in comparison to a refractive power that corrects a near visual acuity of the eye, or a region that has a near optical power, near power, or near vision power. The vision correction region of the present lenses, that is the region having a distance optical power, is structured (sized, shaped, or both sized and shaped) to provide clear vision to the patient at both near and far viewing distances. Thus, the vision correction region can comprise a spherical power, a cylindrical or cylinder power, or both a spherical power and a cylindrical power. The optical power of the vision correction region of the ophthalmic lens can be provided by a spherical lens surface curvature, an aspherical lens surface curvature, or combinations thereof. As used herein, the vision correction region may have an effective single refractive power. That is, the vision correction region of the ophthalmic lens when measured by a vertometer or focimeter, as used in contact lens manufacturing environments, may appear to have a single refractive power. However, the vision correction region may also have aspheric surfaces that provide more than one refractive power to the vision correction region, but where the lens still has an effective single refractive power.

As used herein, a near distance refers to a viewing distance in which the target being viewed is about 60 cm or less from the patient. The viewing distance may also be referred to as a target distance. Examples of near viewing distances include about 50 cm, about 40 cm, about 35 cm, and about 25 cm. Frequently, and in certain embodiments disclosed herein, near visual acuity is measured at about 40 cm. As used herein, a far distance refers to a viewing distance or target distance in which the target being viewed is at least 400 cm. Examples of far viewing distances include at least 400 cm, at least 500 cm, and at least 600 cm. As used herein, an intermediate viewing distance refers to a distance between a near viewing distance and a far viewing distance. For example, an intermediate viewing distance refers to a distance from about 61 cm to about 399 cm, and includes as an example, about 80 cm, about 100 cm, about 120 cm, and about 140 cm.

In view of the above, it can be understood that the vision correction region of the present ophthalmic lenses has a refractive power that provides clear vision to the patient at target distances of less than about 60 cm, and at distances from about 400 cm to infinity. The vision correction region of the present ophthalmic lenses also provides clear vision to the patient at intermediate target or viewing distances.

In comparison, commercially available bifocal contact lenses have not been described to include a distance vision region that provides clear vision at both near and far distances. Instead, commercially available bifocal contact lenses, such as the ACUVUE bifocal contact lenses from Johnson & Johnson, provide a distance vision region to provide clear vision at far distances, and provide a near vision region to provide clear vision at near distances. Thus, the two refractive powers of the bifocal contact lens provide clear vision by using two different regions of the lens (i.e., distance vision regions and near vision regions). The ACUVUE bifocal contact lens has an 8 mm diameter optic zone consisting of a central distance zone having a diameter of 2 mm, and five alternating near and distance zones surrounding the central distance zone. The sizes of the different zones are important for the ACUVUE bifocal contact lens to provide enough distance vision correction through the distance zones while viewing far distances, and to provide enough near vision correction through the near zones while viewing near distances.

In comparison, the present ophthalmic lenses have a vision correction region that has distance optical power and is structured to provide clear vision at both near distances and far distances. In other words, the patients use only the distance optical power of the ophthalmic lens to provide clear visual acuity at both near distances and far distances. This is due at least in part to the fact that the non-presbyopic patients provided with the present ophthalmic lenses are able to sufficiently accommodate during near viewing and so they can effectively view near targets without having their vision negatively compromised by the lens. It is predicted that using lenses with distance vision regions of a smaller size would require the patient to use the near vision regions of a bifocal lens, such as the ACUVUE bifocal contact lens, to see clearly at near distances.

The present ophthalmic lenses also comprise a myopic defocus region(s), as stated above. The myopic defocus region has a refractive power that is different than the refractive power of the vision correction region. The myopic defocus region is structured (sized, shaped, or sized and shaped) to provide a myopically defocused image to the patient, while, when viewing at near viewing distances and at far viewing distances, the patient is simultaneously provided with clear vision by the vision correction region, that is, the region with distance optical power.

As used herein, myopic defocus refers to a defocused image formed in front of the retina by an ophthalmic lens. The myopic defocus can be understood to be positive in that the defocused image created by the ophthalmic lens is located anterior to the retina of the eye upon which the ophthalmic lens is acting.

The refractive power of the myopic defocus region is typically less negative than the refractive power of the vision correction region. For example, if the power of the vision correction region is about −10 diopters, the refractive power of the myopic defocus region can be about −9.0 diopters, about −8 diopters, about −7 diopters, about −6 dipters, about −5 diopters, about −4 dipters, about −3 diopters, about −2 diopters, about −1 diopters, or about 0 diopters. The refractive power of the vision correction region of the present ophthalmic lenses can be from about 0 diopters to about −10 diopters, and the refractive power of the myopic defocus is about 2 diopters less negative than the refractive power of the vision correction region. The refractive power of the myopic defocus region can be less negative (by any diopter amount) than the refractive power of the vision correction region. The refractive power of the myopic defocus region can be a negative diopter, zero diopters, or a positive diopter. Significantly, since the patient provided with the present ophthalmic lens or lenses uses the distance vision region to see clearly at near and far distances, the myopic defocus region is not used by the patient to provide clear vision at near distances (in contrast to the near vision zone of commercially available bifocal contact lenses) and instead, the myopic defocus region is effective in providing a defocused image to the patient simultaneously with a clear image at both near and far distances.

The ophthalmic lenses can provide myopic defocus that causes the myopic defocus of the eye to be different at near viewing distances and at far viewing distances. For example, the myopic defocus of the eye at a near viewing distance differs from the myopic defocus at a far viewing distance by a number of diopters that is less than or equal to the accommodative error of the patient's eye. For example, if the amount of central myopic defocus at a far viewing distance is about +2 diopters, and the patient's eye has an accommodative lag of about −0.75 diopters at near, then the central myopic defocus at a near viewing distance is about +1.25, and the difference between the central myopic defocus at near and at far viewing distances is about 0.75 diopters. Similarly, the level of accommodative lead present in the eye of a patient can effect the level of myopic defocus experienced at near viewing distances and far viewing distances.

When the present ophthalmic lenses described herein are provided to a lens wearer or patient who is capable of ocular accommodation, a reduced accommodative error of the patient is observed when the ophthalmic lens is disposed relative to the patient's eye to provide vision correction. The reduction in accommodative error is in comparison to the accommodative error of the patient observed without the ophthalmic lens but fully corrected for distance vision. In some situations, the reduction in accommodative error may be in comparison to the accommodative error of the patient observed with a single vision ophthalmic lens without a myopic defocus region and comprising a near vision zone.

The vision correction region, the myopic defocus region, or both, can comprise or include, consist essentially of, or consist of a plurality of sub-regions or zones, as described herein.

Thus, it can be understood that an aspect of the present invention relates to the use of the ophthalmic lens described above to reduce accommodative error in a patient. The invention, thus, in part, relates to the use of a contact lens having a vision correction region and a myopic defocus region, as described herein, to reduce accommodative error in a patient.

An aspect of the present invention can be understood to be a method for reducing accommodative error in a patient, comprising a step of providing an ophthalmic lens as described above, wherein a reduced accommodative error of the patient is observed when the ophthalmic lens is disposed relative to the patient's eye to provide vision correction compared to the accommodative error of the patient observed without the ophthalmic lens but fully corrected for distance vision. The eye to which the effects of the ophthalmic lens are compared can be fully corrected for distance vision by using a second lens other than the ophthalmic lens that provides the reduction in accommodative error, such as a spectacle lens, a different contact lens, another type of lens, or even mathematically. Such a method can comprise providing a contact lens having a vision correction region and a myopic defocus region, as described herein, wherein a reduced accommodative error of the patient is observed when the contact lens is disposed relative to the patient's eye to provide vision correction compared to the accommodative error of the patient observed without the contact lens but fully corrected for distance vision.

The reduction in accommodative error can include a reduction in accommodative lag, a reduction in accommodative lead, or both. For example, if a patient exhibits an accommodative lag of about −1.5 diopters, with the present lenses, the accommodative lag can be less negative or more positive than about −1.5 diopters. For example, the accommodative lag can be reduced from −1.5 diopters to −1.2 diopters, −1.0 diopters, −0.75 diopters, −0.5 diopters, and the like. If the accommodative error with the present lenses is observed to be about 0 diopters, the accommodative error of the patient has been corrected or treated.

FIG. 1 illustrates an example of an ophthalmic lens in accordance with the present invention. In this example, the ophthalmic lens 10 is a contact lens. The lens 10 has a vision correction region 12 and a myopic defocus region 14. The vision correction region 12 and the myopic defocus region 14 define an optic zone 16 of the lens 10. The optic zone 16 is circumscribed by a non-optical peripheral zone 18 which extends from an outer perimeter of the optic zone 16 to a peripheral edge zone 20 of the lens 10. It can be appreciated from FIG. 1 that the optic zone 16 comprises or consists of a plurality of concentric rings circumscribing a central circular zone.

In the lens 10 illustrated in FIG. 1, the vision correction region 12 comprises a central zone 22. As described herein, central zone 22 has a distance optical power. Central zone 22 is centered about the optical axis 24 of the lens 10. Central zone 22 is illustrated as being circular or substantially circular. The central zone of the contact lens can have a diameter greater than 2.0 mm. The diameter of the central zone 22 can be determined by measuring a straight line through the optic axis 24 to opposing perimeter boundaries of the central zone 22 in a two-dimensional front plan view of the contact lens. The contact lens can comprise a central zone 22 having a distance optical power and a diameter of at least 2.3 mm. The contact lens can comprise a central zone 22 having a distance optical power and a diameter of at least 2.5 mm. The contact lens can comprise a central zone 22 having a distance optical power and a diameter of at least 3.3 mm. The contact lens can comprise a central zone 22 having a distance optical power and a diameter greater than 4.0 mm.

The lens 10 illustrated in FIG. 1 can comprise an annular zone 26 circumscribing the central circular zone 22. The annular zone 26 can be a zone of a single refractive power such that it appears as a single ring when viewed with optical instruments, or it can be a zone having multiple refractive powers such that the annular zone 26 appears to have a plurality of sub-rings. In FIG. 1, the annular zone 26 comprises or includes, consists essentially of, or consists of a plurality of concentrically arranged sub-rings 26a, 26b, and 26c. Thus, in a contact lens provided in the present methods, the contact lens may comprise a myopic defocus region that comprises or includes, consists essentially of, or consists of a first annular zone, such as ring 26a, adjacent to and circumscribing the circular central zone 22. Alternatively or in addition, a contact lens as shown in FIG. 1 comprises an annular zone 26 circumscribing the central circular zone 22, and the annular region comprises a plurality of annular concentrically arranged sub-rings 26a, 26b, and 26c, at least one of the sub-rings, such as sub-ring 26a, being a portion of the myopic defocus region 14, and at least one of the sub-rings, such as sub-ring 26b, being a portion of the vision correction region 12. For the purposes of the present disclosure, a sub-ring is a portion of the vision correction region 12 or the myopic defocus region 14 if the sub-ring has a refractive power that is similar (e.g., within 20% or within 0.25 diopters) or the same as the refractive power of the vision correction region 12 or the refractive power of the myopic defocus region 14, respectively. In FIG. 1, the lens 10 comprises sub-ring 26c, which is a portion of the myopic defocus region 14. The diameter of the optic zone 16 is typically 9.0 mm or less. For example, the diameter of the optic zone can be about 8.0 mm. The width of the annular region corresponds to the difference between the optic zone diameter and the central zone diameter divided by two. For example, if the optic zone diameter is 8.0 mm, and the central zone diameter is 3.0 mm, the width of the annular region is 2.5 mm. The width of each sub-ring can vary by any value so long as the annular zone does not extend beyond the perimeter of the optic zone.

FIG. 2 illustrates a further example of an ophthalmic lens in accordance with the present invention. In this example, the ophthalmic lens 30 is a contact lens. The lens 30 has a central circular zone 32, a first annular zone 34, and a second annular zone 36. The lens 30 has a vision correction region and a myopic defocus region, with a transition region between the vision correction region and the myopic defocus region. As an example, the central circular zone 32 is a portion of the vision correction region, the first annular zone 34 comprises a transition region, and the second annular zone is a portion of the myopic defocus region. In an alternate example, the central circular zone 32 is a portion of the myopic defocus region, the first annular zone 34 comprises a transition region, and the second annular zone is a portion of the vision correction region. The central circular zone 32, the first annular zone 34 and the second annular zone 36 define an optic zone 38 of the lens 30. The optic zone 38 is circumscribed by a non-optical peripheral zone 40 which extends from an outer perimeter of the optic zone 38 to a peripheral edge zone 42 of the lens 30.

In the lens 30 illustrated in FIG. 2, the vision correction region comprises a central zone 32. As described herein, central zone 32 has a distance optical power. Central zone 32 is centered about the optical axis of the lens 30. Central zone 32 is illustrated as being circular or substantially circular. In the present methods, the central zone of the contact lens can have a diameter greater than 2.0 mm. The diameter of the central zone 32 can be determined by measuring a straight line through the optic axis 44 to opposing perimeter boundaries of the central zone 32 in a two-dimensional front plan view of the contact lens. The contact lens can comprise a central zone 32 having a distance optical power and a diameter of at least 2.3 mm. The contact lens can comprise a central zone 32 having a distance optical power and a diameter of at least 2.5 mm. The contact lens can comprise a central zone 32 having a distance optical power and a diameter of at least 3.3 mm. The contact lens can comprise a central zone 32 having a distance optical power and a diameter greater than 4.0 mm.

The lens 30 illustrated in FIG. 2 can comprise a first annular region 34 circumscribing the central circular zone 32. In FIG. 2, the first annular region 34 comprises an aspheric transition region. Where the central circular zone 32 can comprise the vision correction region and the second annular region 36 comprises the myopic defocus region, the first annular region 34 can comprise an aspheric transition from the vision correction region on the inner perimeter of the annular region 34 to the myopic defocus region on the outer perimeter of the annular region 34. Similarly, where the central circular zone 32 comprises the myopic defocus region and the second annular region 36 comprises the vision correction region, the first annular region 34 can comprise an aspheric transition from the myopic defocus region on the inner perimeter of the annular region 34 to the vision correction region on the outer perimeter of the annular region 34. Additionally, the central circular zone 32 can be aspheric across its diameter, and/or the first annular region can be aspheric, and/or the second annular region can be aspheric, or any combinations thereof.

In the present invention, the method can be effective in providing an accommodative error that is less than +1.5 diopters and is greater than −1.5 diopters when the patient is viewing a target distance no greater than 60 cm.

In the present invention, the method can be effective in providing an accommodative error that is less than +1.5 diopters and is greater than −1.5 diopters when the patient is viewing a target distance from 60 cm to about 400 cm.

In the present invention, the vision correction region can have a single refractive power for correcting the patient's distance visual acuity, and the vision correction region provides clear visual acuity to the patient at a target distance less than 60 cm, and the myopic defocus region provides myopic defocus at the same time that the patient sees a clear near image at the target distance. As used herein, clear visual acuity is typically determined by an optician providing a visual acuity test, such as by using a standard letter chart. For the purposes of this disclosure, clear visual acuity can mean that a lens wearer has a vision score from about 20/40 to about 20/10 when wearing the present contact lenses and when viewing far target distances, such as a target distance of 600 cm.

In any of the present methods, the providing may comprise providing the lens to a lens distributor, providing a lens to an optician, such as an optometrist or ophthalmologist, providing the lens to the patient, or any combinations thereof. The present methods can be directed at a lens manufacturer providing ophthalmic lenses to lens distributors, such as lens retailers, who may then provide the lenses to opticians or patients. The present methods can be directed at a lens manufacturer or a lens distributor providing ophthalmic lenses to opticians. The methods can be directed at opticians providing the lenses to patients, and instructing the patients on how to wear the lenses.

In the present invention, the providing step can comprise or include, consist essentially of, or consist of providing the ophthalmic lens to an optician so that the optician or eye examiner observes the accommodative error of the patient's eye with the ophthalmic lens disposed on, in or near the patient's eye. The methods can comprise an additional step of measuring the accommodative error of the patient's eye. The measuring can be performed by an optician, a person working with or for the optician, or by a machine.

In further methods, such as the methods described in the preceding paragraph, the providing step can consist essentially of providing the lens to a lens distributor, providing a lens to an optician, including to an optometrist or ophthalmologist, providing the lens to the patient, or any combinations thereof. In still further methods, such as the methods in the preceding paragraph, the providing step can consist of providing the lens to a lens distributor, providing a lens to an optician, including an optometrist or ophthalmologist, providing the lens to the patient, or combinations thereof.

In any of the present methods, the providing step may comprise providing first and second lenses. When the lenses are contact lenses, the providing can comprise providing a first box of lenses, or providing a first box and a second box of lenses.

The present contact lenses provided in the present methods can be soft contact lenses, that is, they are contact lenses that have a flexibility to substantially conform to the shape of an eye of a lens wearer when placed on the lens wearer's eye. A soft contact lens is also able to be folded without breaking. Typically, soft contact lenses are referred to as hydrogel contact lenses, as compared to rigid gas permeable contact lenses. As used herein, a hydrogel contact lens refers to a polymeric lens that has the ability to absorb and retain water in an equilibrium state. In the context of the present description, a hydrogel lens can be polymeric material that is free of a silicone-containing component, or a hydrogel lens can be a polymeric material that includes a silicone-containing component. Many silicone-free hydrogel contact lenses are based on polymerizable lens formulations that include hydroxyethyl methacrylate (HEMA) monomers. Some examples of hydrogel contact lens materials include materials having the following US Adopted Names (USANs): etafilcon A, nelfilcon A, ocufilcon A, ocufilcon B, ocufilcon C, ocufilcon D, and omafilcon A. In addition, the present contact lenses may be hydrogel contact lenses that are based on lens formulations that contain glyceryl methacrylate (GMA) alone or in combination with HEMA. Silicone-containing hydrogel contact lenses are frequently referred to as silicone hydrogel contact lenses. Many silicone hydrogel contact lenses are based on polymerizable lens formulations that include siloxane monomers, oligomers, or macromers. Some examples of silicone hydrogel contact lens materials include materials having the following USANs: acquafilcon A or aquafilcon A, balafilcon A, comfilcon A, enfilcon A, galyfilcon A, lenefilcon A, lotrafilcon A, lotrafilcon B, and senofilcon A.

The present contact lenses may be the polymerized reaction product of a polymerizable composition that comprises one or more hydrophilic monomers, one or more hydrophobic monomers, one or more silicone-containing monomers, oligomers, or macromers, one or more polymers, or any combinations thereof. In addition, the polymerizable compositions used to make the present lenses may include crosslinking agents, free radical initiators, tinting agents, and/or UV absorbers, and the like. The present soft contact lenses may comprise or include, consist essentially of, or consist of, any of the foregoing contact lens materials identified by the USAN names above. In one embodiment, the present lenses are made from omafilcon A. In other embodiments, the present lenses are silicone hydrogel contact lenses are made from comfilcon A or enfilcon A.

The present contact lenses can be molded contact lenses, such as spin-cast molded or cast molded contact lenses, or lathed contact lenses. It can be appreciated that these types of contact lenses can have different physical features resulting from their method of manufacture. A cast molded contact lens refers to a contact lens obtained from a contact lens mold assembly formed from two contact lens mold sections in contact with each other to form a contact lens shaped cavity. In addition, a portion of the present contact lenses can be polished or smoothed after forming the contact lens. For example, a contact lens that has been cast molded or lathed, or both, can be polished to reduce transition areas or improve edge shapes to provide greater comfort compared to unpolished lenses.

The present contact lenses can be daily wear lenses or extended wear lenses. As used herein, an extended wear contact lens refers to a contact lens that is approved for wearing on a continuous basis for more than 24 hours. Each contact lens of the lens pair can be a daily disposable contact lens (i.e., a contact lens that is worn on a person's eye only once and then discarded). In comparison, as understood by persons of ordinary skill in the art, a daily wear lens is a lens that is worn on a person's eye, and is then cleaned and is worn on the person's eye for at least one additional time. It can be appreciated that daily disposable contact lenses can be physically different, chemically different, or both compared to daily wear and extended wear contact lenses. For example, formulations used to make daily wear or extended wear contact lenses are different than formulations used to make daily disposable contact lenses due to the economic and commercial factors in making substantially larger volumes of daily disposable contact lenses.

The present contact lenses are placed on a patient's eye such that the posterior surface of the lens faces the corneal epithelium of the eye of the patient. Corneal onlay lenses, corneal inlay lenses, or intraocular lenses are surgically placed in the eye. Spectacle lenses are disposed in front of a patient's eye.

As a further example, a method for reducing accommodative error in a patient capable of ocular accommodation comprises or includes a step of providing a contact lens to be placed on a patient's eye capable of ocular accommodation. The contact lens comprises a vision correction region and a myopic defocus region. The vision correction region has a refractive power to correct the patient's distance visual acuity of the eye and is structured to provide clear vision to the patient at both near and far viewing distances. The vision correction region can comprise a central circular zone having a diameter greater than 2.0 mm. The myopic defocus region has a refractive power different than the refractive power of the vision correction region and is structured to provide a defocused image to the patient while viewing at near and at far viewing distances while the patient is provided with clear vision by the vision correction region. The myopic defocus region is provided in one or more annular regions circumscribing the central circular zone. The contact lens is effective in causing the patient to exhibit an accommodative lag less than −1.5 diopters. In the present invention, the contact lens can be effective in causing the patient to exhibit an accommodative lag less than −1.0 diopters. The contact lens of the method can be effective in causing the patient to exhibit an accommodative error from about −0.5 diopters to about +0.5 diopters. In another example, the contact lens can be effective in causing the patient to exhibit a reduction in accommodative error of at least 0.5 diopters, at least 1 diopter, or at least 1.5 diopters. The contact lens is effective in causing the patient to exhibit a reduction in accommodative lag of at least 0.5 diopters, at least 1 diopter, or at least 1.5 diopters.

In view of the disclosure herein, it can be appreciated that aspects of the present invention relate to the manufacture of ophthalmic lenses.

In one context, an aspect of the present invention relates to the use of a lens forming material, such as a polymerizable composition, or the use of a lens design, in the manufacture of an ophthalmic lens for reducing accommodative error in a patient capable of ocular accommodation. The ophthalmic lenses are described herein, and it can be understood that the ophthalmic lens so manufactured comprises a vision correction region and a myopic defocus region, wherein the vision correction region has a refractive power to correct the patient's distance visual acuity of the eye and is structured to provide clear vision to the patient at both near and far viewing distances, and the myopic defocus region has a refractive power different than the refractive power of the vision correction region and is structured to simultaneously provide a defocused image to the patient while viewing at near and at far viewing distances while the patient is provided with clear vision by the vision correction region, wherein a reduced accommodative error of the patient is observed when the ophthalmic lens is disposed relative to the patient's eye to provide vision correction compared to the accommodative error of the patient observed without the ophthalmic lens but fully corrected for distance vision.

In another context, an aspect of the present invention relates to a method of manufacturing an ophthalmic lens for reducing accommodative error in a patient capable of ocular accommodation. The method comprises a step of forming a lens forming material into an ophthalmic lens to be disposed relative to a patient's eye capable of ocular accommodation. The ophthalmic lens comprises a vision correction region and a myopic defocus region, wherein the vision correction region has a refractive power to correct the patient's distance visual acuity of the eye and is structured to provide clear vision to the patient at both near and far viewing distances, and the myopic defocus region has a refractive power different than the refractive power of the vision correction region and is structured to provide a defocused image to the patient while viewing at near and at far viewing distances while the patient is provided with clear vision by the vision correction region, wherein a reduced accommodative error of the patient is observed when the ophthalmic lens is disposed relative to the patient's eye to provide vision correction compared to the accommodative error of the patient observed without the ophthalmic lens but fully corrected for distance vision.

When the ophthalmic lenses are cast molded contact lenses, the forming step comprises cast molding a polymerizable composition into the shape of a contact lens, separating the cast molded contact lens from a contact lens mold member, contacting the separated cast molded contact lens with a liquid, inspecting the separated cast molded contact lens, packaging the separated cast molded contact lens in a contact lens package, and/or sterilizing the contact lens in the package, or any combinations thereof.

One method of forming a cast molded contact lens is as follows. First and second mold members are produced. The first and second mold members are structured to be coupled together to form a contact lens mold assembly. The first mold member is a front surface mold member, and it includes a concave lens forming surface which will form the front surface of the contact lens. The second mold member is a back surface mold member, and it includes a convex lens forming surface which will form the back surface of the contact lens. The first mold member is produced to include one or more surface curvatures on its concave surface. The surface curvatures are dimensioned to provide a vision correction region and a myopic defocus region as described herein. A polymerizable composition is produced and includes reactive ingredients, and optionally non-reactive ingredients, used in forming contact lenses. The ingredients can include one or more hydrophilic monomers, oligomers, macromers, or polymers; one or more hydrophobic monomers, oligomers, macromers, or polymers; one or more silicone-containing monomers, oligomers, macromers, or polymers; or any combinations thereof. The polymerizable composition is dispensed onto the concave surface of the first mold member. The second mold member is placed against the first mold member to form a contact lens mold assembly having a contact lens shaped cavity with the polymerizable composition located therein. The contact lens mold assembly is then exposed to heat or light to polymerize the polymerizable composition and form a polymerized contact lens product. The contact lens mold assembly is demolded by separating the first and second mold members. The polymerized contact lens product remains attached to the first or the second mold member, and is then delensed or separated from the mold member. The delensed contact lens is contacted with a liquid, which may be a washing liquid, or it may be a packaging liquid. In some methods, the washing liquid includes one or more agents to help extract unreacted or partially reacted ingredients from the delensed contact lens product. Methods can include one or more steps of inspecting the lens in a dry state, a wet state, or both. The inspection can include inspecting for defects or inspecting for quality control purposes. Once the lenses are placed in a packaging liquid, the packages can be sealed, and sterilized.

In view of the foregoing description, still additional aspects of the present invention may be understood to include the following. Each of the details described above can apply to any one or more of the embodiments in the following paragraphs and still be within the scope of the present invention.

One aspect of the present invention relates to the use of an ophthalmic lens as an accommodative error-reducing device that is effective when the ophthalmic lens is disposed relative to the patient's eye to provide vision correction in an eye of a patient capable of ocular accommodation and who has an accommodative error. The effects of the accommodative error reduction are compared to the accommodative error of the patient observed without the ophthalmic lens but fully corrected for distance vision. The ophthalmic lens used comprises or includes a vision correction region and a myopic defocus region, wherein the vision correction region has a refractive power to correct the patient's distance visual acuity of the eye and is structured (i.e., sized, shaped, both sized and shaped, etc) to provide clear vision to the patient at both near viewing distances and far viewing distances, and the myopic defocus region has a refactive power different than the refractive power of the vision correction region and is structured (i.e., sized, shaped, both sized and shaped, etc) to provide a myopic defocused image to the patient while viewing at near and at far viewing distances while the patient is provided with clear vision by the vision correction region. One aspect of the present invention may be viewed as use of an ophthalmic lens to reduce accommodative error in a patient capable of ocular accommodation and who has an accommodative error. The ophthalmic lens being used is a contact lens.

Another aspect of the present invention is the use of an ophthalmic lens to reduce accommodative error in an eye of a patient capable of ocular accommodation and who has an accommodative error. The ophthalmic lens used comprises or includes a vision correction region and a myopic defocus region, wherein the vision correction region has a refractive power to correct the patient's visual acuity of the eye and is structured (i.e., sized, shaped, both sized and shaped, etc.) to provide clear vision to the patient at both near viewing distances and far viewing distances, and the myopic defocus region has a refractive power different than the refractive power of the vision correction region and is structured to provide a defocused image to the patient while viewing at near and at far viewing distances while the patient is provided with clear vision by the vision correction region. The ophthalmic lens being used can be a contact lens.

Another aspect of the present invention is an ophthalmic lens for use in reducing accommodative error in an eye of a patient capable of ocular accommodation and who has an accommodative error. The ophthalmic lens comprises or includes a vision correction region and a myopic defocus region, wherein the vision correction region has a refractive power to correct the patient's distance visual acuity of the eye and is structured (i.e., sized, shaped, both sized and shaped, etc.) to provide clear vision to the patient at both near viewing distances and far viewing distances, and the myopic defocus region has a refractive power different than the refractive power of the vision correction region and is structured (i.e., sized, shaped, both sized and shaped, etc.) to provide a myopic defocused image to the patient while viewing at near viewing distances and at far viewing distances while the patient is provided with clear vision by the vision correction region. The ophthalmic lens can be a contact lens.

Another aspect of the present invention is a lens-forming material for use in the manufacture of an ophthalmic lens for reducing accommodative error in an eye of a patient capable of ocular accommodation and who has an accommodative error. The ophthalmic lens comprises or includes a vision correction region and a myopic defocus region, wherein the vision correction region has a refractive power to correct the patient's distance visual acuity of the eye and is structured (i.e., sized, shaped, both sized and shaped, etc.) to provide clear vision to the patient at both near viewing distances and far viewing distances, and the myopic defocus region has a refractive power different than the refractive power of the vision correction region and is structured (i.e., sized, shaped, both sized and shaped, etc.) to provide a myopic defocused image to the patient while viewing at near viewing distances and at far viewing distances while the patient is provided with clear vision by the vision correction region. The ophthalmic lens can be a contact lens.

Yet another aspect of the present invention is an ophthalmic lens design for use in the manufacture of an ophthalmic lens for reducing accommodative error in an eye of a patient capable of ocular accommodation and who has an accommodative error. The ophthalmic lens comprises or includes a vision correction region and a myopic defocus region, wherein the vision correction region has a refractive power to correct the patient's distance visual acuity of the eye and is structured (i.e., sized, shaped, both sized and shaped, etc.) to provide clear vision to the patient at both near viewing distances and far viewing distances, and the myopic defocus region has a refractive power different than the refractive power of the vision correction region and is structured (i.e., sized, shaped, both sized and shaped, etc.) to provide a myopic defocused image to the patient while viewing at near viewing distances and at far viewing distances while the patient is provided with clear vision by the vision correction region. The ophthalmic lens design can be a contact lens design.

Aspects of the present methods may be further understood by consideration of the following example:

Example 1

A hydrogel contact lens is provided as shown in FIG. 1. The contact lens is a cast molded contact lens made from omafilcon A as described in the description above. The contact lens has a central circular zone having distance optical power. The diameter of the central zone of the hydrated contact lens is about 3.3 mm, and the central zone has a refractive power of −3.00 diopters. The sub-ring corresponding to sub-ring 26a has a diameter of 4.8 mm (inclusive of the central zone) and has a refractive power of −1.00 diopter. The sub-ring corresponding to sub-ring 26b has a diameter of 6.8 mm and has a refractive power of −3.00 diopters. The sub-ring corresponding to sub-ring 26c has a diameter of 9.0 mm and has a refractive power of −1.00 diopter.

Accommodative error measurements of a 13 year old myope are recorded. Measurements are made with a refractometer or retinoscope at a target distance of 40 cm and a target distance of 600 cm. Measurements are made for the patient's left eye without the lens but with distance vision fully corrected and with the contact lens described above. Measurement data are illustrated in FIG. 3. With the lens present, the patient experiences reduced accommodative error compared to when the lens is not present.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method for reducing accommodative error in a patient capable of ocular accommodation, comprising:
    providing an ophthalmic lens to be disposed relative to a patient's eye capable of ocular accommodation, the ophthalmic lens comprising a vision correction region and a myopic defocus region, wherein the vision correction region has a refractive power to correct the patient's distance visual acuity of the eye and is structured to provide clear vision to the patient at both near and far viewing distances, and the myopic defocus region has a refractive power different than the refractive power of the vision correction region and is structured to provide a myopic defocused image to the patient while viewing at near and at far viewing distances while the patient is provided with clear vision by the vision correction region, wherein the myopic defocus at a near viewing distance differs from the myopic defocus at a far viewing distance by a number of diopters that is greater than or equal to the accommodative error of the patient's eye,
    wherein a reduced accommodative error of the patient is observed when the ophthalmic lens is disposed relative to the patient's eye to provide vision correction compared to the accommodative error of the patient observed without the ophthalmic lens but fully corrected for distance vision.

2. The method of claim 1, wherein the ophthalmic lens is a contact lens.

3. The method of claim 2, wherein the vision correction region includes a circular zone that includes the optic axis of the lens and has a diameter greater than 2.0 mm.

4. The method of claim 3, wherein the myopic defocus region includes a first annular region adjacent to and circumscribing the circular zone.

5. The method of claim 3, wherein the contact lens includes an annular region circumscribing the circular zone, the annular region comprising a plurality of annular concentrically arranged sub-rings, at least one of the sub-rings being a portion of the myopic defocus region, and at least one of the other sub-rings being a portion of the vision correction region.

6. The method of claim 1, wherein the accommodative error of the patient is less than +1.5 diopters and greater than −1.5 diopters when the patient is viewing a target distance no greater than 60 cm.

7. The method of claim 1, wherein the accommodative error of the patient is less than +1.5 diopters and greater than −1.5 diopters when the patient is viewing a target distance from about 60 cm to about 400 cm.

8. The method of claim 1, wherein the vision correction region has an effective single refractive power for correcting the patient's distance visual acuity, the vision correction region providing clear visual acuity to the patient at a target distance less than 60 cm, and the myopic defocus region providing myopic defocus at the same time the patient sees a clear near image at the target distance.

9. The method of claim 1, wherein the providing comprises providing the lens to a lens distributor, providing the lens to an optician, providing the lens to the patient, or combinations thereof.

10. The method of claim 1, wherein the providing comprises providing first and second lenses.

11. The method of claim 1, wherein the providing comprises providing the ophthalmic lens to an optician so that the optician observes the accommodative error of the patient's eye with the ophthalmic lens disposed thereto.

12. The method of claim 1, further comprising the step of measuring the accommodative error of the patient's eye.

13. The method of claim 1, wherein the accommodative error is an accommodative lag.

14. The method of claim 1, wherein the accommodative error is an accommodative lead.

15. A method of manufacturing an ophthalmic lens for reducing accommodative error in a patient capable of ocular accommodation, comprising:
    forming a lens forming material into an ophthalmic lens to be disposed relative to a patient's eye capable of ocular accommodation, the ophthalmic lens comprising a vision correction region and a myopic defocus region, wherein the vision correction region has a refractive power to correct the patient's distance visual acuity of the eye and is structured to provide clear vision to the patient at both near and far viewing distances, and the myopic defocus region has a refractive power different than the refractive power of the vision correction region and is structured to provide a myopic defocused image to the patient while viewing at near and at far viewing distances while the patient is provided with clear vision by the vision correction region, wherein the myopic defocus at a near viewing distance differs from the myopic defocus at a far viewing distance by a number of diopters that is greater than or equal to the accommodative error of the patient's eye,
    wherein a reduced accommodative error of the patient is observed when the ophthalmic lens is disposed relative to the patient's eye to provide vision correction compared to the accommodative error of the patient observed without the ophthalmic lens but fully corrected for distance vision.

16. The method of claim 15, wherein the forming comprises cast molding a polymerizable composition into the shape of a contact lens, separating the cast molded contact lens from a contact lens mold member, contacting the separated cast molded contact lens with a liquid, inspecting the separated cast molded contact lens, packaging the separated cast molded contact lens in a contact lens package, sterilizing the contact lens in the package, or combinations thereof.

\* \* \* \* \*